United States Patent
Borkam et al.

(10) Patent No.: US 8,776,004 B2
(45) Date of Patent: Jul. 8, 2014

(54) METHOD FOR IMPROVING STATIC TIMING ANALYSIS AND OPTIMIZING CIRCUITS USING REVERSE MERGE

(75) Inventors: Frank Borkam, San Carlos, CA (US); Hemlata Gupta, Hopewell Jct., NY (US); David J. Hathaway, Underhill, VT (US); Kerim Kalafala, Rhinebeck, NY (US); Vasant Rao, Fishkill, NY (US); Alex Rubin, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 13/006,450

(22) Filed: Jan. 14, 2011

(65) Prior Publication Data

US 2012/0185810 A1    Jul. 19, 2012

(51) Int. Cl.
*G06F 9/455* (2006.01)
*G06F 17/50* (2006.01)

(52) U.S. Cl.
USPC ............ 716/134; 716/108; 716/132; 716/113

(58) Field of Classification Search
CPC ............ G06F 17/5077; G06F 17/5054; G06F 17/5068; G06F 1/10; G06F 2217/12; H01L 23/522; H01L 23/5286
USPC .......................... 716/132, 133, 134, 135, 108
See application file for complete search history.

(56) References Cited

U.S. PATENT DOCUMENTS

| | | | |
|---|---|---|---|
| 6,185,723 B1* | 2/2001 | Burks et al. | 716/108 |
| 2003/0140324 A1* | 7/2003 | Yalcin et al. | 716/6 |
| 2009/0300559 A1* | 12/2009 | Baumgartner et al. | 716/5 |
| 2010/0306724 A1* | 12/2010 | Kim et al. | 716/6 |
| 2010/0313176 A1* | 12/2010 | Takahashi et al. | 716/108 |
| 2012/0124534 A1* | 5/2012 | Kalafala et al. | 716/108 |
| 2012/0144357 A1* | 6/2012 | Musante et al. | 716/113 |

OTHER PUBLICATIONS

"Transistor-Level Tools for High-End Processor Custom Circuit Design at IBM", by Karen Bard, et al., Proceedings of the IEEE, vol. 95, No. 3, Mar. 2007, pp. 530-554.

* cited by examiner

*Primary Examiner* — Nha Nguyen
*Assistant Examiner* — Brian Ngo
(74) *Attorney, Agent, or Firm* — H. Daniel Schnurmann

(57) ABSTRACT

Determining static timing analysis margin on non-controlling inputs of clock shaping and other digital circuits using reverse merge timing includes: selecting one or more circuits within the logic design having a plurality of inputs and using reverse merge; identifying a controlling input of the selected circuit from among this plurality of inputs; and determining for at least one non-controlling input of the circuit, a timing value that may be used to drive design optimization based on the difference between arrival times of the controlling and non-controlling inputs.

15 Claims, 4 Drawing Sheets

METHOD FOR IMPROVING STATIC TIMING ANALYSIS AND OPTIMIZING CIRCUITS USING REVERSE MERGE

FIELD OF THE INVENTION

The present invention relates to Design Automation, and more particularly, to a system and a method for determining accurate static timing results on non-controlling inputs of clock shaping and other digital circuits using reverse merge timing.

BACKGROUND

Static timing analysis (STA) has been widely used in the industry to determine the latest and earliest possible switching times of various signals within a digital circuit. STA can generally be performed at the transistor level, using circuit simulation packages such as SPICE, or at the gate level, using pre-characterized library elements, or at higher levels of abstraction, for complex hierarchical chips.

Conventional STA algorithms operate by first levelizing the logic structure, and breaking any loops in order to create a directed acyclic graph (timing graph). Modern designs often include millions of placeable objects, with corresponding timing graphs having millions, if not tens of millions of nodes. For each node, a corresponding arrival time, transition rate (slew), and required arrival time are computed for both rising and falling transitions as well as early and late mode analysis. The arrival time (AT) represents the latest or earliest time at which a signal can transition due to the entire upstream fan-in cone. The slew value is the transition rate associated with a corresponding AT. A required arrival time (RAT) represents the latest or earliest time at which a signal must transition due to timing constraints in the entire downstream fan-out cone.

Referring to FIG. 1, ATs are propagated forward in a levelized manner, starting from the design primary input asserted (i.e., user-specified) arrival times, and ending at either primary output ports or intermediate storage elements. For single fan-in cases, AT sink node=AT source node+delay from source to sink.

Whenever multiple signals merge, each fan-in contributes a potential arrival time computed as:

AT sink(potential)=AT source+delay, making it possible for the maximum (late mode) or minimum (early mode) of all potential arrival times to be retained at the sink node. Typically an exact delay value for an edge in a timing graph is not known, but instead only a range of possible delay values can be determined between some minimum delay and maximum delay. In this case, maximum delays are used to compute late mode arrival times and minimum delays are used to compute early mode arrival times.

Still referring to FIG. 1, RATs are computed in a backward levelized manner starting from either asserted required arrival times at the design primary output pins, or from tests (e.g., setup or hold constraints) at internal storage devices. For single fan-out cases, RAT source node=RAT sink node−delay.

When multiple fan-outs merge (or when a test is present), each fan-out (or test) contributes a prospective RAT, enabling the minimum (late mode) or maximum (early mode) required arrival time to be retained at the source node. When only a range of possible delay values are to be determined, maximum delays are used to compute late mode required arrival times and minimum delays are used to compute early mode required arrival times.

The difference between the arrival time and required arrival time at a node is referred to as slack. Early mode and late mode slacks are distinguished from each other and computed seperately. The equations are:

$$Slack_{early} = AT_{early} - RAT_{early} \quad (1)$$

$$Slack_{late} = RAT_{late} - AT_{late} \quad (2)$$

A positive slack implies that the current arrival time at a given node meets all downstream timing constraints, and a negative slack implies that the arrival time fails at least one such downstream timing constraint. A timing point may include multiple such AT, RAT, and slew values for the purpose of distinguishing information for a specific subset of an entire fan-in cone or fan-out cone.

FIG. 2 illustrates an example of AT propagation for a typical NAND logic gate (200), where for simplicity, a delay of zero is assumed for all transitions. Each of the input signal edges on both inputs A and B (202, 204) create a transition at the output Z (206) of the NAND gate. Due to the bounding approach, earlier arriving signal edges (210, 220) create an early arriving output waveform on Z (250, 260) and a late arriving signal edges (230, 240) creates a late arriving waveform on Z (270, 280). In other words, for early output timing the minimum of the early ATs is propagated. For the late output timing the maximum of late ATs is propagated. This is the standard approach that STA uses for conservatively guard banding timing. Consequently, at output Z the late and early arriving waveforms are clearly distinguishable. The difference of the two waveforms leads to a conservative slack calculation downstream in the timing graph from the NAND gate.

If it is known that the NAND2's input signals on A and B are at logic zero for a portion of each cycle (i.e., each either remains at zero switches to one and back to zero in each cycle), as depicted in the example of FIGS. 2 and 3, the conservatism can be reduced through applying a technique hereinafter referred to as reverse merge timing. FIG. 3 illustrates such instance. For the inputs' rising edges on the NAND2 gate (300), based on its logic function, it is known that when all inputs start at logic zero, only the last input signal to rise (330) can create a falling transition on output (350, 370). Similarly, if all input signals are known to fall, only the first input signal to fall (320) triggers a rising edge at output Z (360, 380). For the early rising input edges this means that the maximum of the early rise ATs is propagated. Similarly, for the late falling input edge the minimum of late falling ATs is propagated to the output rising edge on Z. This mechanism will be referred henceforth as "reverse merge" since it is the opposite of what normal static timing analysis propagation does, as previously described with reference of FIG. 2, i.e., it reverses the roles of the minimum and maximum in early and late timing. Given that early and late arrival times for the inputs signals are the same, as assumed for simplicity, in FIG. 3 it can be seen that early and late output waveforms are identical due to the reverse merge. These result in a reduction of pessimism for downstream timing slacks and, consequently, faster time to market for VLSI designs modeled with that feature.

Referring to FIG. 3, two crossed out input edges at inputs A and B are illustrated (310, 340) which do not contribute in any way to the switching of output Z. Thus, they are referred to "non-controlling" input edges. The input signal edges causing the output to transition are referred to as "controlling" input edges. When all inputs of an AND function (e.g., an AND or NAND gate or an input group of an AND-OR-INVERT gate) are known to reach or remain at a logic zero state in each cycle, the first falling transition among these inputs is controlling, and thus the first falling input transition may be propagated in both early mode (as for normal STA) and late mode (in which propagating it amounts to a reverse merge operation). For the same set of AND function inputs, the last rising input among them is controlling and can be propagated in both late mode (as for normal STA) and early mode (in which propagating it amounts to a reverse merge operation). All other input transitions of the AND function can be considered non-controlling.

A similar analysis can be performed for reverse merge situations on OR gates or more complicated structures such as dynamic circuits encountered in transistor-level custom designs. When all inputs of an OR function (e.g., an OR or NOR gate or an input group of an OR-AND-INVERT gate) are known to reach or remain at a logic one state in each cycle, the first rising transition among these inputs is controlling, and thus the first rising input transition may be propagated in both early mode (as for normal STA) and late mode (in which propagating it amounts to a reverse merge operation). For the same set of OR function inputs, the last falling input among them is controlling and can be propagated in both late mode (as for normal STA) and early mode (in which propagating it amounts to a reverse merge operation). All other input transitions of the OR function can be considered non-controlling. Other circuits exist, including domino circuits that precharge circuit nodes to known values in each cycle, in which signals are known to reach of remain in a particular logic state in each cycle, and to which reverse merge timing may therefore be applied. In domino circuits certain nodes are precharged in each cycle.

Another area that heavily relies on timing analysis is timing optimization. Generally, the goal of optimizing is to improve the slack, power, area or other design metrics for all the circuits in the design such that the optimized parameters reach a designer predetermined target. During optimization, different parameters can be categorized as primary or secondary. Generally, most of the work of the optimization engine is oriented towards improving the primary optimization parameters, followed by any improvements to the secondary optimization parameters that do not cause degradation in the primary parameter optimization results obtained. Currently, state of the art timing optimization engines used in VLSI designs focus on slack improvement as a primary optimization parameter. To avoid design quality degradation, the remaining metrics, such as power and area, can only be optimized if the primary parameter can be measured.

Optimization is generally accomplished with a series of manipulations to restructure the design, reduce the capacitive load on gate outputs, improves signal propagation through the use of larger devices and other similar methods. Any design change made by optimization that does not result in an improvement of the targeted metrics is typically discarded and a different change is attempted following some predetermined heuristics.

In late mode static timing analyses, the designer attempts to ensure that the latest possible arriving signal at the storage element is correctly captured. Therefore, late mode timing optimization techniques aim at speeding up slow timing paths to obtain a desired clock frequency. In an early mode analysis, the designer attempts to guarantee that the traveling signal remains stable long enough to be captured by a timing element, thereby ensuring that the design is operational. For early mode analyses, the goal of the optimization is to slow down paths that are too fast, which could invalidate the signal before it is properly stored.

From the above, it is clear that current state of the art optimization techniques are precluded from processing any timing paths that do not have a defined value for a primary optimization parameter, e.g., slack. This can pose a difficulty in timing closure of designs that use the reverse merge.

Although reverse merge is a useful technique, it creates a dilemma when computing the slack for the non-controlling edges. If the slack to be calculated is the conventional case given by previously described equations (1) and (2), a non-controlling input will appear to be more critical (i.e., smaller signed algebraic slack value) than the actual controlling input. For example, considering the timing diagram in FIG. 2, given that all delays through the exemplary NAND gate are zero, an identical late mode RAT value will be propagated backwards from the downstream common output Z to both inputs A and B. However, since the first late falling transition (320) controls the output rising transition (380), the non-controlling last late falling transition (340) computes a worse slack value [RAT(A)=RAT(B) and late AT(B) non controlling>late AT (A) controlling, therefore SLACK(B) <SLACK(A)]. Such a situation can produce misleading guidance to a designer or optimization program that relies on slack values, since the more critical slack on the non-controlling late input B can provide an incentive to speed up the non-controlling signal, which in turn may end having no effect on the output timing.

To avoid this erroneous situation, prior art methods do not propagate any RAT to the non-controlling input edge of a reverse merge, and consequently no slack can be calculated in such a case. This may introduce at least two undesirable side effects. Firstly, in the absence of any slack, an optimization tool or process cannot attempt to improve non-controlling path which is particularly detrimental if the non-controlling path can easily be improved (FIG. 4). Note that failing to consider the non-controlling path during optimization results in an opportunity loss. Secondly, in cases where arrival times shift against each other in such a way that a new controlling arrival time is selected, a sudden slack discontinuity may occur. Referring back to the example on FIG. 3, let it be assumed that the late falling input signal transitions are involved in a reverse merge. Input A presently propagates a slightly smaller late mode arrival time, and thus represents a controlling arrival time for the output node's rising edge. Now, if either A or B arrival times change slightly, such that signal B arrives earlier than A, then B represents the new controlling arrival time in the reverse merge situation. Consequently, input A will change from having a valid slack to an invalid slack value, and input B will change from an invalid slack to suddenly propagating a valid slack. Such discontinuities (i.e., large changes in measured slack value for small change in arrival time) can make it very difficult for automated optimization algorithms to efficiently close timing on designs containing such reverse merge situations. For the same reason, it is difficult for designers analyzing timing reports to completely understand the relationship between these input signals.

In view of the foregoing, there is a need for a system and method for determining static timing analysis margin on non-controlling inputs of clock shaping and other digital circuits using reverse merge timing.

BRIEF DESCRIPTION OF THE DRAWINGS

The present invention will be understood and appreciated more fully from the following detailed description of the invention, taken in conjunction with the accompanying drawings, wherein.

SUMMARY OF THE INVENTION

Figure 1:
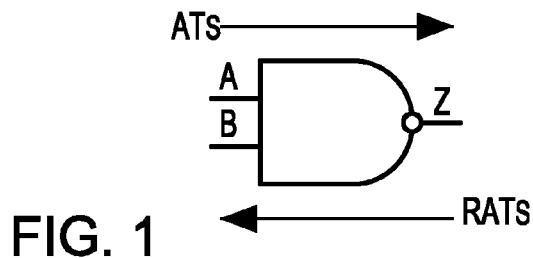
FIG. 1 is a conventional NAND2 gate illustrating forward propagation of arrival times and backwards propagation of required arrival times.
Figure 2:
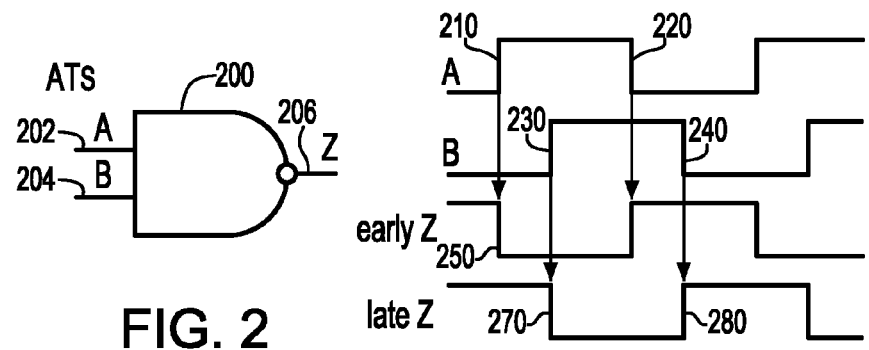
FIG. 2 is a conventional NAND2 gate with its input and output waveforms showing conventional static timing analysis propagation of arrival times.

In one aspect, an embodiment of the invention provides a system and method for improving accuracy during a static timing analysis of a logic design, including: a) using a computer, applying a reverse merge to a reverse merge point of a selected circuit within the logic design, the circuit having a plurality of inputs; b) identifying a controlling input of the selected circuit controlling an arrival time of an output of the selected circuit; and c) determining for a non-controlling input of the circuit at least one timing value based on a difference of the arrival times between the controlling and non-controlling inputs. In an aspect of an embodiment of the invention, performing one or more design optimizations based on a non controlling input slack value can be achieved.

In an aspect of an embodiment of the invention, a reverse merge margin is computed as a function of the difference between arrival times on the controlling and the non-controlling inputs.

In an aspect of an embodiment of the invention, one or more optimizations based on a reverse merge margin value are performed. The optimizations can include one or more of the following: a) reducing the area utilization; b) reducing the power consumption; c) reducing the wiring density; and improving the placement while limiting the degradation of primary optimization parameters.

In an aspect of an embodiment of the invention, the optimization can include one or more of the following: d) eliminating a timing race condition; e) enabling said logic design to operate at a specified clock frequency; and f) enabling to operate at an increased clock frequency.

One embodiment of the invention addresses the case where non-controlling signals in clock shaping are present, lacking valid metrics to determine the criticality of all signals in a reverse merge situation. In such instance, the designer is not able to fully understand the timing relationship of signals in the digital designs which involves clock shaping circuits.

One embodiment of the invention further provides a slack metric on the non-controlling input pin as a function of the slack of the controlling input pin of the clock shaping circuit. The calculation of slack correctly captures the true nature of signal criticality in the reverse merge situation, ensuring that slack values at the non-controlling pin are continuous, as is the case for the controlling pins.

Moreover, one embodiment of the invention provides an optimization metric referenced to Reverse Merge Margin (RMM), which provides the exact required minimum amount of improvement in the input arrival time of the non-controlling signal of the clock shaping circuit, in order to achieve a cycle time improvement in paths with the circuits. Integrating the use of this design metric to guide manual or automatic design optimization can enable the treatment of circuits with reverse merge in a holistic manner.

DETAILED DESCRIPTION

The present invention and various features, aspects and advantageous details thereof are explained more fully with reference to the non-limiting embodiments that are illustrated in the accompanying drawings and detailed in the following description. The detailed description section of this patent will provide a complete coverage of an embodiment of the present invention.

Figure 5:
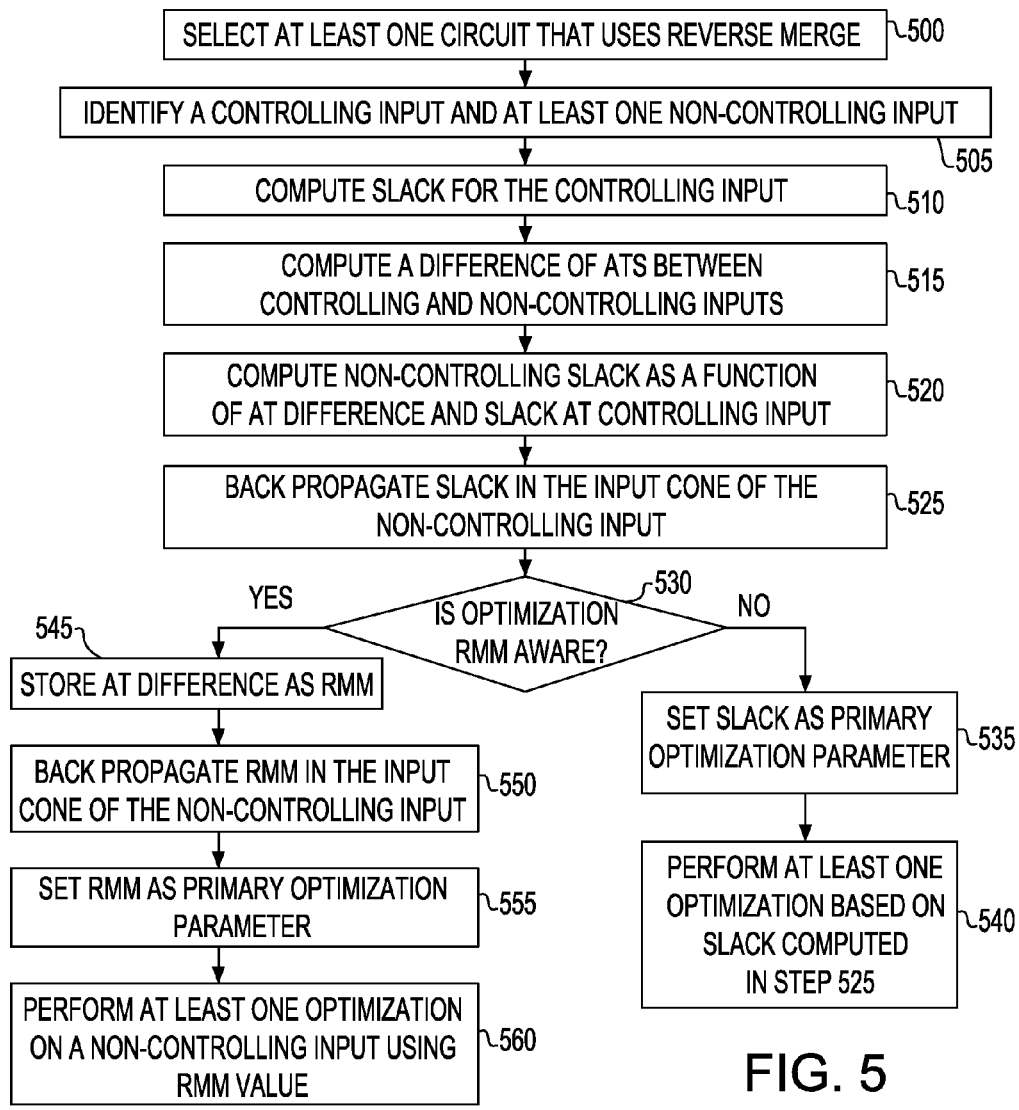
FIG. 5 is a flow chart illustrating a method to quantify timing problems in reverse merge situations, according to one embodiment of the invention.

Referring to FIG. 5, a flowchart is shown that illustrates a first embodiment of the present invention wherein timing problems are quantified for a circuit using reverse merge. Initially, one or more of such circuits are selected (500) to perform the sequence of steps to be described hereinafter.

Given an input signal transition (i.e. rise or fall), at least one controlling input (i.e. the input which leads to a signal transition at the output) and one non-controlling input are determined (505) for the previously selected circuit to allow for the computation of slack for the controlling input (510). This is done based on the inputs' ATs and RATs, preferably by applying equations (1) and (2). Generally, the present invention does not alter the prior art slack calculation on the controlling input edges in a reverse merge scenario. For the non-controlling edges, the previously undefined or non-existent slack value is replaced by the actual slack value. Concurrently, the timing slack can also be continuous.

The aforementioned slack computation for the non-controlling input can be preferably achieved by computing the difference of the ATs between the controlling and non-controlling inputs, hereinafter referred to as the Reverse Merge Margin or RMM (515), followed by computing the slack for the non-controlling input (520). Whereas computing RMM is required, the calculation of slack is optional. In an embodiment of the present invention, the slack is given by the following equations (3) and (4):

$$\text{Slack non-cont, early} = \text{Slack cont, early} + f(\text{AT cont, early} - \text{AT non-cont, early}) \quad (3)$$

$$\text{Slack non-cont, late} = \text{Slack cont, late} + f(\text{AT cont, late} - \text{AT non-cont, late}), \quad (4)$$

wherein the slack for a non-controlling edge is derived based on the slack on the controlling input for the related edge, and the function of the difference in arrival times for controlling and non-controlling input edges. These said arrival times can be measured directly at the input pins or alternatively at the reverse merge point in the timing graph as propagated from those input pins.

Next, the slack is propagated backwards in the input cone of the non-controlling input (525). This can happen either directly by backwards propagating the slack value or, alternatively, or by propagating a RAT value that would result in the computed slack (i.e., Slack non-cont, late+AT non-cont, late, or AT non-cont, early−Slack non-cont, early) as done by a conventional STA.

Figure 6:
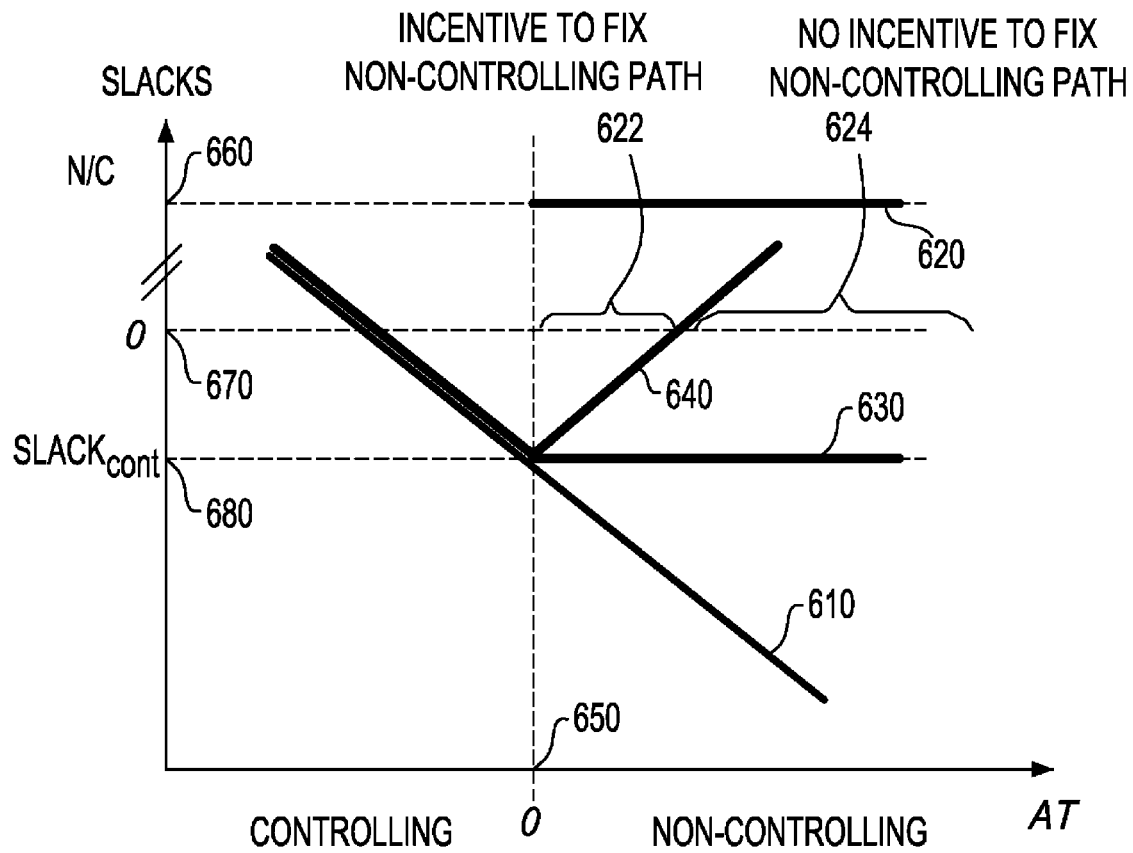
FIG. 6 shows an overview of how slack behaves relative to arrival times for the example of reverse merge on a conventional NAND2 gate, concentrating on the late arrival times of the falling signal edges on its inputs.

Referring to FIG. 6, the behavior of the slack of a particular late mode reverse merge input is illustrated as the input AT varies (e.g., due to changes made to the design by an optimization process) such that the input goes from being the controlling input (when its AT is less than the AT of another reverse merge input, here assumed to be zero) to being a non-controlling input (when its input is greater than the AT of another reverse merge input).

Figure 3:
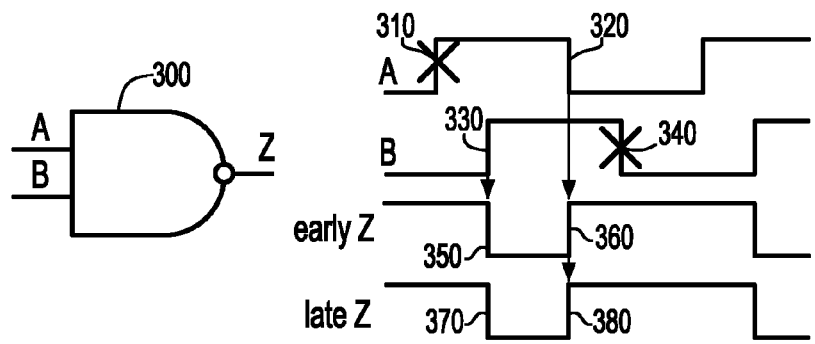
FIG. 3 is a conventional NAND2 gate with its input and output waveforms showing "reverse merge" static timing analysis propagation of arrival times.
Figure 4:
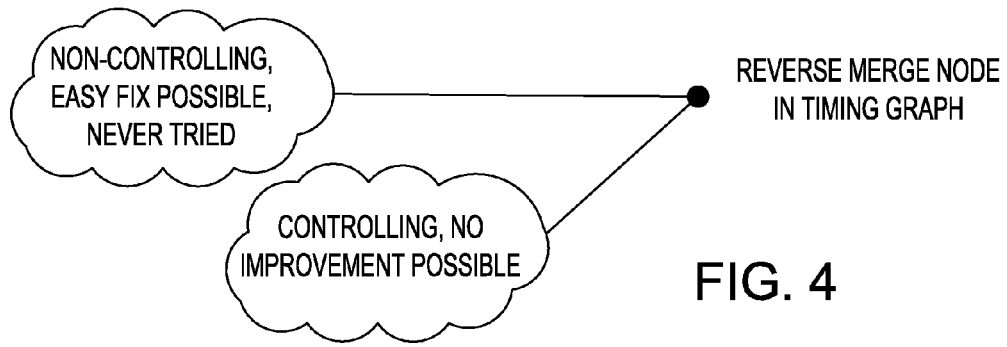
FIG. 4 illustrates a conventional drawback of being unable to optimize non-controlling reverse merge paths.

By way of example, the behavior of the slack applicable to the example of the NAND2 gate (300) as shown in FIG. 3 will now be analyzed, particularly concentrating on the late falling input edges on inputs A and B (320, 340). Given that the signals on both inputs are either switching in every clock cycle or remain at a logic zero, the two falling edges of the inputs signals can be reverse merged, i.e., propagated using the minimum of their late arrival times.

To further understand the present example, reference is now made to FIG. 6, wherein the waveform on input A remains at the same position, with an AT of zero, while the input signal on B is shifted from left to right. The lines in the diagram depict the behavior of slack on B. Shifting B from the left it remains to be the controlling input as long as its falling edge arrives earlier than the fall edge on A, as illustrated on the left side of the diagram. In such an instance, there is no distinction between the behavior of the slack between the prior and the new art. This illustrates the fact that the present invention does not change slacks for the controlling input edge in a reverse merge situation. In each case, while increasing the late arrival time on B, the late slack decreases.

Shifting B further to the right, one eventually reaches the point where the fall edges of A and B exactly coincide, as shown in FIG. 6 by the '0' on the X-axis (650). At this point, the falling input edge at B changes from being controlling to non-controlling. The example of the static timing as described in the prior art may simply calculate the slack in the same manner as done for B when it still remained to be the controlling input edge. This is shown by line (610) in FIG. 6 and computed preferably by equation (2). The resulting disadvantage is that the non-controlling input B will carry a more critical slack than input A despite its being non-controlling. Consequently, this becomes an incorrect and misleading situation which needs to be avoided.

A second example of the prior art shortcomings is to not provide any slack for the non-controlling falling edge of B, effectively treating the slack of B as infinite, as illustrated by line 620, and indicated by the 'not calculated' (N/C) tag on the Y-axis (660). The resulting drawback is a discontinuous slack behavior illustrated, as shown in FIG. 6, by the gap between the defined slack value (680) and the 'not calculated' value (660).

The present invention addresses both shortcomings of the prior art as illustrated by lines 630 and 640 in FIG. 6. In one embodiment of the invention, deriving the slack on the non-controlling pin is shown by equations (3) and (4), and by simplifying the function of the difference of arrival times to a multiplication with a factor K, that leads to equation (5) in which for late arrival times:

$$\text{Slack non-cont, late} = \text{Slack cont, late} + K(\text{AT non-cont, late} - \text{AT cont, late}) \quad (5)$$

It can be shown that for K=0, line 630 results to be the slack on the non-controlling pin, creating an undesirable ambiguity because both, the controlling and the non-controlling input falling edges, have the same slack. To resolve this situation, values of K>0 are preferably chosen. Then, the non-controlling input edge does have a slack which is less critical than the controlling input edge, making it possible to discern correctly which of the input signals are non-controlling, while at the same time preserving the continuous behavior of the slack values, shown by line 640.

Based on one embodiment of the present invention, a timing optimization tool can now work on improving the slack on the non-controlling path as well. For instance, still referring to FIG. 6, assuming that the goal of the optimization is to work on the slack as a primary optimizing parameter with the slack target of zero for all timing checks, the non-controlling path will be actively targeted by the optimizer as long as the slack is less than zero as shown by the "Incentive to fix non-controlling path" tag (622). For slacks larger than zero, there is no incentive to improve the slack, as indicated by 624.

Therefore, an optimization system and the presence of the slack metric on the non-controlling pins as defined by the present invention can now correctly process both, controlling and non-controlling signals feeding into reverse merge nodes. This enables the optimization to attempt changes to non-controlling pins of reverse merge circuits assuming the paths through these pins have slacks below the optimization target, where paths through the controlling pins of the reverse merge circuit cannot be improved.

Changes made by the optimization can affect slacks in discrete ways. A significant speed up or slow down of the previously non-optimized non-controlling path can cause the arrival times of input signals of the reverse merge circuit to shift relative to each other significantly, making a formerly non-critical input become critical. If such shift occurs, further optimization of the path through the formerly non-critical pin can significantly improve the overall timing quality of the design.

Cmall individual optimization changes, such as might be made at the finishing stages of the automatic optimization run, may not change the arrival time values for the non-controlling reverse merge pin enough to force its slack to become critical. In this case, no overall design improvement will be measured after a single optimization change, and further improvement will require an RMM aware optimization. This decision point is shown on FIG. 5 step (530).

If RMM aware optimization is not possible, the slack metric alone is used as a primary optimization parameter (535), and this slack is used as a basis for optimization operations (540). For controlling inputs, the prior art definition of slack can still be applied. For non-controlling inputs, the new slack definition to be applied can be defined by equations (3) and (4).

Figure 7:
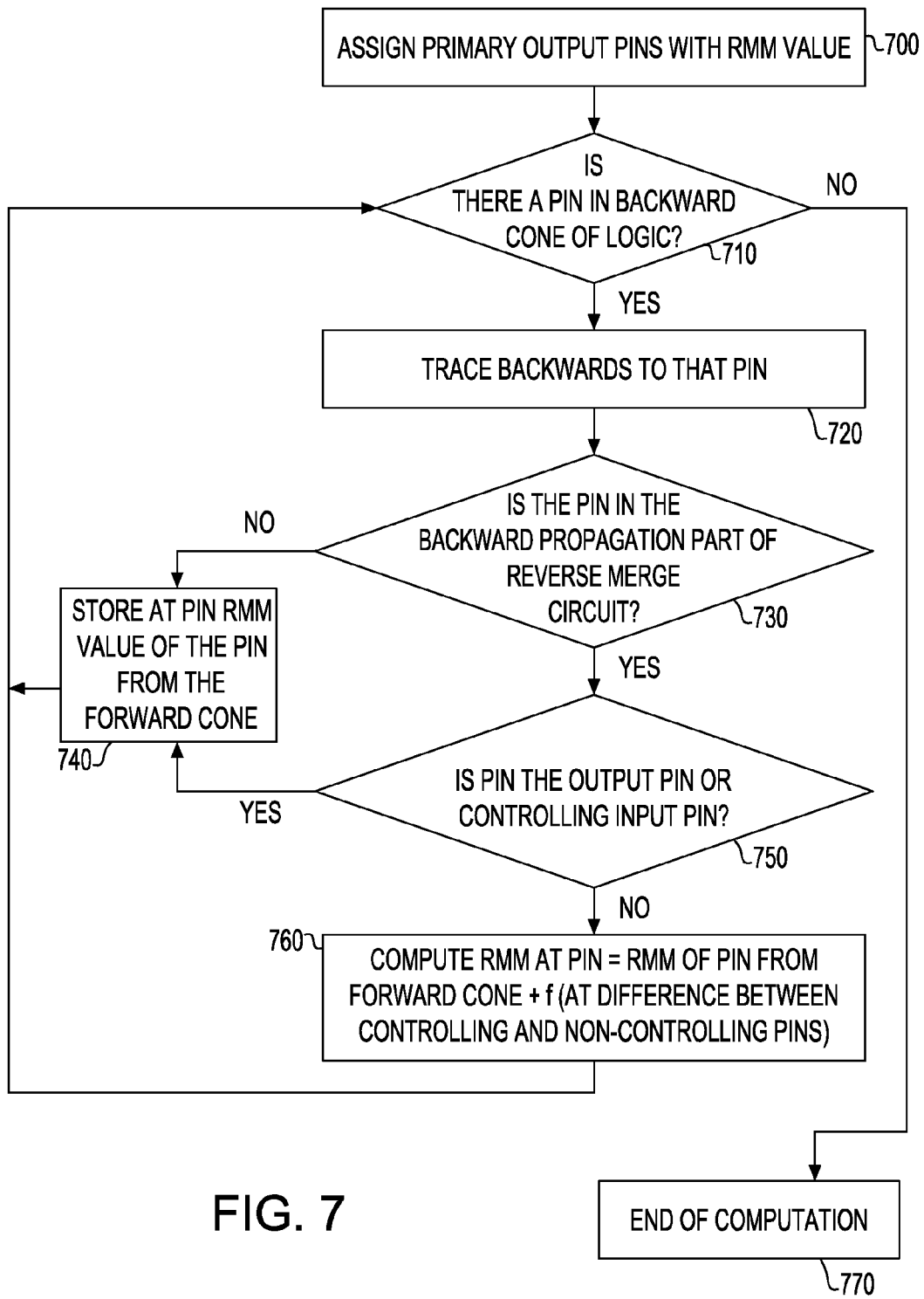
FIG. 7 is a flow chart illustrating a method of computing reverse merge margin (RMM) quantity for all the timing points in the logic design by starting with RMM value at primary output pins and propagating it backwards.

If RMM aware optimization is possible, the previously computed difference in AT values between controlling and non-controlling inputs of the circuit using reverse merge is stored at the corresponding input pin as an RMM value (545). This value can be backward propagated in the input cone of the non-controlling input (550). This propagation is shown in detail in the illustrative flow chart depicted in FIG. 7 and is described in the RMM propagation details hereafter.

One method of calculating RMM and propagating RMM backwards in the logic design is starting with the primary output pins of the design and assigning the RMM value of 0 for them (700). This flow of computing RMM value is repeated for all the primary output pins of the design.

Next step is to check if the selected pin is driven by another circuit (710). If that is not the case the computation for RMM values would end for this particular trace (770). Otherwise trace backwards to a logic pin in the backward cone to compute the RMM value (720). If there are multiple pins in the backward cone then the calculation would be repeated for everyone of them.

The selected pin may or may not be a part of a reverse merge circuit. Check if the circuit is using reverse merge circuit (730). If the circuit is not using reverse merge then the RMM value for that pin is going to be same as the RMM of the pin from forward cone of logic (740).

If the selected pin is part of a reverse merge circuit and is either an output pin of the circuit or is the controlling input pin of the circuit (750), then the RMM value for that pin would be same as the RMM of the pin from forward cone of logic (740).

If the selected pin is part of reverse merge circuit and is one of the non-controlling input pins, compute the RMM value for that pin (760) using the equation:

$$\text{RMM non-controlling input pin} = \text{RMM output pin} + f(\text{AT}_{\text{non-cont}} - \text{AT}_{\text{cont}}) \quad (6)$$

Another method of the RMM calculation would involve getting all the circuits that are using the reverse merge timing and levelize them using backward propagation. The flow of computing RMM in such a method would start with output pins of the circuits closest to the primary outputs of the design, and assign a RMM value of zero for them. This would be replacing step 700 in the flow chart while keeping the rest of the flow the same. If a pin X has N immediate successor pins the slack and RMM values of X must be found by combining the values that would be generated by each of its successors. Let the individually generated slack values at X from these N successors be $S\_1, \ldots S\_N$, according to equations (1) and (2), using RATs computed using normal static timing analysis for controlling inputs of reverse merge nodes or non-reverse merge situations and using equations (3) and (4) for non-controlling inputs of reverse merge nodes. Let the corresponding individually determined RMM values propagated back to X from these successors be $RMM\_1, \ldots RMM\_N$. The slack of X due to the combined effect of these successors will be then be the minimum of these slacks $S\_1 \ldots S\_N$, and the combined RMM value for X will be the minimum over all successors i of $(S\_i+RMM\_i)-\text{slack of X}$. This alternate method would result in memory and run time improvements. Those skilled in the art will understand that other methods of backward propagating RMM values through the timing graph are possible.

Once the RMM values are correctly propagated through the timing graph, their value can be set to supersede the slack as the primary optimization metric for the reverse merge circuits (555). Changes made by the optimization to the non-controlling pin will attempt to shift the input AT value to reduce the RMM (560), even if that causes the slack metric to degrade. Reaching a zero RMM value indicates that the optimization tool has shifted the AT value of the non-controlling input far enough to make it controlling. Any further shift in the AT values of the input will result in the overall improvement in the design as measured by the prior art definition of slack. Therefore, the slack can again be set as a primary optimization metric. Timing improvements may eliminate or reduce race conditions between signals, enable a design to operate at a specified clock frequency, or increase the maximum clock frequency at which the design will operate correctly.

Additional benefit of this invention is the ability to optimize secondary parameters such as power, wireability, area utilization, placement and yield. Once primary parameters, such as slack and RMM values, are optimized, additional optimization can be obtained on secondary parameters as long as it does not cause degradation in the values of the primary parameters.

The present embodiments do not restrict optimization steps to those performed by automated tools. It rather applies broadly to any method of introducing design changes that can utilize presently defined slack and RMM values. The inventive method can be applied to any circuits in which signals are known to reach or remain in particular logic states (e.g., logic one or logic zero), and to which reverse merge timing may be applied, including but not limited to clock shaping circuits and domino circuits.

The present invention can be realized in hardware, software, or a combination of hardware and software. The present invention can be realized in a centralized fashion in one computer system or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after conversion to another language, code or notation and/or reproduction in a different material form.

While the present invention has been particularly described in conjunction of a simple illustrative embodiment, it is to be understood that one of ordinary skill in the art can extend and apply this invention in many obvious ways. Other embodiments of the invention can be adapted thereto. It is evident that many alternatives, modifications and variations will be apparent to those skilled in the art in light of the present description. It is therefore contemplated that the appended claims will embrace any such alternatives, modifications and variations as falling within the true scope and spirit of the present invention.

What is claimed is:

1. A method for improving accuracy of a static timing analysis of a logic design comprising:
    a) applying a reverse merge to a reverse merge point of a selected circuit within said logic design by using a computer, said circuit having a plurality of inputs;
    b) identifying a controlling input of said selected circuit controlling an arrival time of an output of said selected circuit; and
    c) identifying a non-controlling input of said selected circuit that does not control said arrival time at said output of said circuit;
    d) determining an arrival time difference by subtracting an arrival time of said controlling input of said circuit from an arrival time of said non-controlling input of said circuit; and
    e) determining for said non-controlling input of said circuit at least one timing value based on said arrival time difference,
    f) performing design optimization on non-controlling input shifts said input arrival time (AT) value to reduce said reverse merge margin (RMM) metric
    wherein reaching a zero RMM value indicates that said optimization shifts said AT of said non-controlling input to convert it to a controlling input.

2. The method as recited in claim 1 wherein said determining said timing value comprises a slack, said determining timing value being further dependent on the slack of said controlling input.

3. The method recited in claim 1 wherein said determining said timing value comprises a required arrival time (RAT) dependent on said controlling input.

4. The method as recited in claim 1 wherein said determining said timing value comprises a reverse merge margin (RMM), said determined timing value being further dependent on the RMM of said reverse merge point.

5. The method as recited in claim 1 further comprising performing at least one design optimization based on said timing value of said non-controlling input.

6. The method as recited in claim 1 wherein said applying a reverse merge is applied to a clock shaping circuit.

7. The method as recited in claim 1 wherein said applying a reverse merge is applied to a domino circuit.

8. The method as recited in claim 2 wherein said slack on said non-controlling input is less critical than the slack on said controlling input.

9. The method as recited in claim 2 wherein said slack on said non-controlling input is continuous across all arrival time values of said controlling and non-controlling inputs.

10. The method as recited in claim 5, wherein said optimization uses said RMM as an optimization metric providing a required amount of improvement on said input arrival time of a non-controlling signal of said reverse merge circuit.

11. The method as recited in claim 10, wherein said optimization further comprises at least one of: a) eliminating a timing race condition; b) enabling said logic design to operate at a specified clock frequency; and c) enabling to operate at an increased clock frequency.

12. The method as recited in claim 1, wherein said identified controlling input and said non-controlling input are determined based on input signal transitions of said selected circuit.

13. The method as recited in claim 1, wherein said timing value of said non-controlling input does not affect the timing values on said controlling input.

14. The method as recited in claim 10, wherein said further comprises at least one of: a) reducing the area utilization; b) reducing the power consumption; c) reducing wiring density; d) improving placement while limiting degradation of primary optimization parameters; and increasing yield.

15. A computer program product by embodying the program in a computer storage device for improving accuracy during a static timing analysis of a logic design, comprising:
 a) computer program code configured for applying a reverse merge to a selected circuit within said logic design, said circuit having a plurality of inputs;
 b) computer program code configured for identifying a controlling input of said selected circuit controlling an arrival time of an output of said selected circuit; and
 c) computer program code configured for identifying a non-controlling input of said selected circuit that does not control said arrival time at said output of said circuit;
 d) computer program code configured for determining an arrival time difference by subtracting an arrival time of said controlling input of said circuit from an arrival time of said non-controlling input of said circuit; and
 e) computer program code configured for determining for said non-controlling input of said circuit at least one timing value based on said arrival time difference,
 f) performing design optimization on non-controlling input shifts said input arrival time (AT) value to reduce said reverse merge margin (RMM) metric
 wherein reaching a zero RMM value indicates that said optimization shifts said AT of said non-controlling input to convert it to a controlling input.

* * * * *